United States Patent Office 3,435,071
Patented Mar. 25, 1969

3,435,071
PROCESS FOR PREPARING TROPONEIMINES
Genshun Sunagawa, Nobuo Soma, Taiichiro Watanabe, and Yoshio Sato, Tokyo, Japan, assignors to Sankyo Company, Limited, Tokyo, Japan
No Drawing. Filed June 29, 1965, Ser. No. 468,131
Int. Cl. C07c 85/06, 85/00, 85/02
U.S. Cl. 260—566
1 Claim

ABSTRACT OF THE DISCLOSURE

Process for preparing 2-aminotroponeimine derivatives useful as antiinflammatory, analgesic and antipyretic agents and as intermediates for the synthesis of color formers. The process comprises reacting 2-oxy (or thio) troponeimine derivatives with an amine derivative in the presence of an inorganic acid or an aliphatic carboxylic acid.

Summary of the invention

This invention relates to a novel process for preparing troponeimines, and, more particularly, to a novel process for preparing the troponeimines having the formula

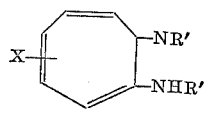

(I)

wherein X represents hydrogen; halogen such as chlorine or bromine; a straight or branched lower alkyl group such as methyl, ethyl, propyl or isopropyl or phenyl; and R′ represents a straight or branched lower alkyl such as methyl, ethyl, propyl or isopropyl; phenyl; phenyl substituted with halogen, nitro, a lower alkyl, a lower alkoxy or a di(lower alkyl)amino such as p-chlorophenyl, p-nitrophenyl, p-(or m-)tolyl, p-methoxyphenyl or p-dimethylaminophenyl; benzyl; a di(lower alkyl)amino lower alkyl such as dimethylaminomethyl, diethylaminomethyl, dimethylaminoethyl or diethylaminopropyl; or monophenylamino group.

As the process for preparing the troponeimines having the above Formula I has been hithertofore known the process disclosed in the Journal of the American Chemical Society, 83, 3125 (1961). The prior process involves reacting cyclopentadiene with tetrafluoroethylene to form tetrafluorobicycloheptene and converting the latter compound to tetrafluorocycloheptadiene followed by reaction of the latter compound with amines. However, there is required in such a process a pyrolytic procedure carried out at an elevated temperature under reduced pressure, from which results the essential requirement of various special equipments so that the prior process may be considered to be disadvantageous for the industrial scale. Furthermore, according to the prior process, it is very difficult to produce the troponeimines having optional substituent in the cycloheptatriene ring.

It has now been found that the troponeimines having the above Formula I possess potent anti-inflammatory, analgesic and antipyretic activies and also that they may be employed as useful intermediates for synthesis of color formers.

Therefore, it is an object of this invention to provide a novel and advantageous process for preparing the troponeimines having the above Formula I, which are valuable medicines and useful intermediates of color formers.

Other objects of this invention will be apparent from the following detailed descriptions.

As a result of numerous researches in order to find out a new and satisfactory method of the preparation of the troponeimines having the above Formula I, it has been found that the troponeimines having the above Formula I can be prepared by reacting a troponeimine derivative having the formula

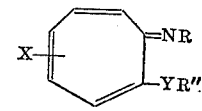

(II)

wherein X is as defined above; R″ represents a lower alkyl such as methyl or ethyl; R represents hydrogen, a straight or branched lower alkyl such as methyl, ethyl, propyl, or isopropyl, a phenyl group unsubstituted or substituted with halogen, nitro, a lower alkyl, or a lower alkoxy such as phenyl, p-chlorophenyl, p-nitrophenyl, p- (or m-) tolyl or p-methoxyphenyl, or benzyl; and Y represents divalent oxygen or sulphur with an amine having the formula

wherein R′ is as defined above in the presence of a mineral acid, a mineral acid ester or a lower alkyl monocarboxylic acid.

In one embodiment of the process according to this invention, the troponeimine derivatives having the above Formula II may be reacted with the amines having the above Formula III in the presence of an acid and of a suitable inert solvent to form the desired troponeimines having the above Formula I. Examples of the suitable inert solvent to be employed include water; aqueous inert organic solvents, such as aqueous alcohols, for example, aqueous methanol or ethanol and aqueous dioxane; and inert organic solvents such as aromatics, for example, benzene, toluene or xylene and dioxane.

Suitable acids to be employed are, for example, mineral acids such as hydrochloric acid or sulfuric acid; mineral acid esters such as half ester of sulfuric acid, for example, sulfuric acid monomethyl ester or monoethyl ester; and lower alkyl monocarboxylic acids such as acetic acid or propionic acid. The time and temperature of the reaction are not critical features of this invention, and, generally, it is preferable to conduct the reaction at the temperature within the range from room temperature to a reflux temperature of the solvent employed for about 1 hour to about 50 hours.

In an alternative embodiment of the process according to this invention, acid addition salts of the troponeimine derivatives having the Formula II may be reacted with the amines having the above Formula III in the presence of an inert solvent and in the absence of an acid to form the desired troponeimines having the above Formula I. The acid to be employed in the formation of corresponding acid addition salts of the starting troponeimines may be any of those set forth hereinabove. The inert solvent, time and temperature in the reaction to be employed may also be any of those set forth hereinabove.

After completion of the reaction, the desired troponeimines may be recovered from the reaction mixture by any of the known and familiar procedures in the art. For instance, after completion of the reaction, where the desired troponeimine is present in the reaction mixture in the form of a solid crystalline substance, the desired product may be recovered by filtration and purified by recrystallization from such a suitable organic solvent as benzene or ethanol. And, where the desired troponeimine is dissolved in the aqueous reaction mixture, the desired product may be recovered by extraction with such a suitable organic solvent as benzene or chloroform, removal of the organic solvent from the extract and recrystallization of the residue from such a suitable organic solvent as benzene, chloroform or ethyl acetate.

The starting troponeimine derivatives employed in the process according to this invention, wherein Y is divalent sulfur atom, are novel compounds and may be easily prepared by reacting the corresponding 2-aminotroponethione compound with dialkyl sulfate such as dimethyl or diethyl sulfates.

The following examples are given for the purpose of illustrating the preferred embodiments of this invention, and not intended to limit the scope thereof.

Example 1

To a solution of 3.0 g. of 2-methoxytroponeimine in 30 ml. of 50% ethanol are added 3 ml. of 10% hydrochloric acid and 6.0 g. of isopropylamine and the resulting mixture is allowed to stand overnight and then refluxed for 2 hours.

After completion of the reaction, the reaction mixture is concentrated under reduced pressure and the residue is extracted with benzene. The extract is dried over anhydrous sodium sulfate and the benzene is distilled off. The residue is chromatographed on alumina with benzene. From the benzene effluent is obtained crystalline substances, which are then recrystallized from ethanol to give 2.4 g. of 2-isopropylamino-N-isopropyltroponeimine, melting at 62° C.

Example 2

To a solution of 2.0 g. of 2-methoxytroponeimine monomethyl sulfate in 20 ml. of 50% ethanol is added 10 ml. of a 40% aqueous monomethylamine solution and the resulting mixture is allowed to stand at room temperature overnight.

After completion of the reaction, the reaction mixture is concentrated under reduced pressure, water is added to the residue, thereby separating crystalline substances, which are recovered by filtration and recrystallized from methanol to give 1.1 g. of 2-methylamino-N-methyltroponeimine as yellow leaves melting at 67° C.

Example 3

To a solution of 1.6 g. of 2-methoxytroponeimine in 20 ml. of ethanol are added 5.0 g. of p-aanisidine and 0.5 ml. of glacial acetic acid and the resulting mixture is refluxed for 2.5 hours.

After completion of the reaction, the reaction mixture is concentrated, the residue is shaken with a mixture of chloroform and 10% hydrochloric acid and then the chloroform layer is separated. The chloroform solution thus separated is shaken with 5% sodium bicarbonate solution and then with water and thereafter dried over anhydrous sodium sulfate. The chloroform is distilled off from the solution to yield 3.2 g. of 2-(p-anisidino)-N-(p-methoxyphenyl)troponeimine, melting at 113° C.

Example 4

To a solution of 2.0 g. of 2-methoxytroponeimine in 20 ml. of ethanol are added 5.0 g. of p-toluidine and 2 ml. of 10% hydrochloric acid and the resulting mixture is refluxed for 2 hours.

After completion of the reaction, the reaction mixture is concentrated, the residue is shaken with a mixture of chloroform and 10% hydrochloric acid and then the chloroform layer is separated. The chloroform solution thus separated is shaken with 5% sodium bicarbonate solution and then with water and thereafter dried over anhydrous sodium sulfate. The chloroform is distilled off to yield crystalline substances, which are then recrystallized from ethanol to give 2.8 g. of 2-(p-toluidino)-N-(p-tolyl)troponeimine, melting at 143° C.

Example 5

To a solution of 2.0 g. of 2-methoxytroponeimine in 20 ml. of ethanol are added 5.0 g. of aniline and 0.5 ml. of acetic acid and the resulting mixture is refluxed for 3 hours.

After completion of the reaction, the reaction mixture is concentrated, the residue is shaken with a mixture of chloroform and 10% hydrochloric acid and the chloroform layer is separated. The chloroform solution thus separated is shaken with 5% sodium bicarbonate solution and dried over anhydrous sodium sulfate. The chloroform is distilled off from the solution to yield crystalline substances, which are then recrystallized from ethanol to give 2.1 g. of 2-anilino-N-phenyltroponeimine, melting at 87° C.

Example 6

To a solution of 3.0 g. of 2-methoxytroponeimine monomethylsulfate in 20 ml. of water is added 15 ml. of benzylamine and the resulting mixture is allowed to stand at room temperature overnight.

After completion of the reaction, the crystalline substance separating in the reaction mixture, is recovered by filtration followed by recrystallization from ethanol to give 7.2 g. of 2-benzylamino-N-benzyltroponeimine, melting at 81° C.

Example 7

To a solution of 2.0 g. of 2-methoxytroponeimine in 20 ml. of ethanol are added 2.2 g. of β-dimethylaminoethylamine and 0.5 g. of acetic acid and the resulting mixture is allowed to stand at room temperature for 2 days.

After completion of the reaction, the ethanol is distilled off and the residue is dissolved in benzene. The benzene solution is washed with water, dried over anhydrous sodium sulfate and concentrated. The residue is chromotagraphed on alumina with benzene. From the benzene effluent is distilled off the benzene to leave 0.9 g. of 2-(β-dimethylaminoethylamino)-N-(β-dimethylaminoethyl)-troponeimine as yellow oily substances. The corresponding trimaleate is yellow needles melting at 163° C. (with decomposition).

Example 8

To a solution of 5.0 g. of 2-methoxytroponeimine monomethylsulfate in 50 ml. of 50% ethanol is added 15 ml. of phenylhydrazine and the resulting mixture is allowed to stand at room temperature for 2 days.

After completion of the reaction, the crystalline substance separating in the reaction mixture, is recovered by filtration and washed with a small amount of ethanol. Thereafter it is dissolved in benzene and the benzene solution is chromatographed on alumina. The benzene is distilled off from the benzene effluent and further the crystalline substance so obtained is recrystallized from cyclohexane to give 4.8 g. of 2-phenylhydrazino-N-anilinotroponeimine as orange-yellow crystals melting at 141° C.

Example 9

To a solution of 2.0 g. of 2-methoxy-5-bromotroponeimine monomethyl sulfate in 30 ml. of water is added 5 ml. of benzylamine and the resulting mixture is allowed to stand at room temperature overnight.

After completion of the reaction, the reaction mixture is extracted with benzene, and the benzene extract is dried over anhydrous sodium sulfate and then concentrated. The residue is chromatographed on alumina with benzene and the benzene is distilled off from the benzene effluent to leave crystalline substances, which are then recrystallized from cyclohexane to give 0.5 g. of 5-bromo-2-benzylamino-N-benzyltroponeimine, melting at 126° C.

Example 10

To a solution of 3.0 g. of 6-isopropyl-2-methoxytroponeimine monomethylsulfate in 20 ml. of water is added 10 ml. of a 30% aqueous monomethylamine solution and the resulting mixture is allowed to stand at room temperature overnight.

After completion of the reaction, the reaction mixture is extracted with benzene, and the benzene extract is dried over anhydrous sodium sulfate and then concentrated. The residue is chromatographed on alumina to yield 1.8 g. of the orange-yellow oily substance, which is 6-isopropyl-2-methylamino-N-methyltroponeimine. The corresponding picrate is a yellow leaf melting at 198° C.

Example 11

To a solution of 0.5 g. of 2-methoxy-3-phenyltroponeimine monomethylsulfate in 20 ml. of water is added 5 ml. of a 30% aqueous monomethylamine solution and the resulting mixture is allowed to stand at room temperature overnight.

After completion of the reaction, the reaction mixture is extracted with benzene, and the benzene extract is washed with water, dried over anhydrous sodium sulfate and then concentrated. The residue is chromatographed on alumina to yield 0.2 g. of the yellow oily substance, which is 3-phenyl-2-methylamino-N-methyltroponeimine. The corresponding picrate is orange-yellow leaves melting at 159° C.

Example 12

To a solution of 1.2 g. of 2-methylthiotroponeimine monomethylsulfate in 10 ml. of water is added 3.6 g. of monomethylamine and the resulting mixture is allowed to stand at room temperature overnight.

After completion of the reaction, the reaction mixture is extracted with benzene, the benzene extract is dried over anhydrous sodium sulfate and the benzene is distilled off. The benzene solution of the residue is chromatographed on alumina with benzene and thereafter with ether. From the ether effluent are obtained crystalline substances, which are then recrystallized from methanol to give 0.2 g. of 2-methylamino-N-methyltroponeimine, melting at 67° C.

Example 13

To a solution of 1.7 g. of 2-methoxy-N-methyltroponeimine monomethylsulfate in 15 ml. of water is added 7 ml. of a 40% aqueous monomethylamine solution and the resulting mixture is allowed to stand at room temperature overnight.

After completion of the reaction, the crystalline substance separating in the reaction mixture is recovered by filtration and then recrystallized from methanol to give 1.0 g. of 2-methylamino-N-methyltroponeimine, melting at 67° C.

Example 14

To a solution of 1.5 g. of 2-methoxy-N-benzyltroponeimine monomethylsulfate in 30 ml. of 30% aqueous ethanol is added 5 ml. of benzylamine and the resulting mixture is allowed to stand at room temperature overnight.

After completion of the reaction, the crystalline substance separating in the reaction mixture is recovered by filtration and recrystallized from ethanol to give 1.0 g. of 2-benzylamino-N-benzyltroponeimine, melting at 81° C.

Example 15

To a solution of 2.0 g. of 2-methoxytroponeimine monomethylsulfate in 30 ml. of 60% ethanol is added 7.5 g. of p-dimethylaminoaniline, and the resulting mixture is heated at 70° C. for 1 hour, and then allowed to stand at room temperature overnight.

After completion of the reaction, the crystalline substance separating in the reaction mixture is recovered by filtration and recrystallized from ethyl acetate to give 2.7 g. of 2-(p-dimethylaminoanilino)-N-(dimethylaminophenyl)troponeimine, melting at 172° C.

Example 16

To a solution of 2.0 g. of 2-methoxytroponeimine in 30 ml. of ethanol are added 5.0 g. of p-nitroaniline and 2 ml. of 10% hydrochloric acid and the resulting mixture is refluxed for 5 hours.

After completion of the reaction, the reaction mixture is cooled and then treated in the same manner as in Example 4 to give 2.0 g. of 2-(p-nitroanilino)-N-(p-nitrophenyl)troponeimine, melting at above 250° C.

Example 17

To a solution of 2.0 g. of 2-methoxytroponeimine in 30 ml. of ethanol are added 5.0 g. of p-chloroaniline and 2 ml. of 10% hydrochloric acid and the resulting mixture is refluxed for 5 hours.

After completion of the reaction, the reaction mixture is treated in the same manner as in Example 4 to yield crystalline substances, which are then recrystallized from ethyl acetate to give 2.5 g. of 2-(p-chloroanilino)-N-(p-chlorophenyl)troponeimine, melting at 169° C.

What is claimed is:

1. A process for preparing a compound having the formula

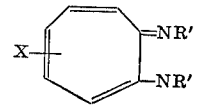

wherein X is hydrogen, bromo, chloro, straight or branched lower alkyl or phenyl and R' is straight or branched lower alkyl; phenyl unsubstituted or monosubstituted with bromo, chloro, nitro, lower alkyl, lower alkoxy, di(lower alkyl) amino; benzyl; di(lower alkyl) amino lower alkyl; or monophenylamino, which comprises reacting a compound having the formula

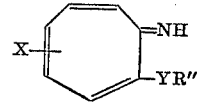

wherein X is as defined above, R" is a lower alkyl and Y is divalent oxygen or sulfur with a compound having the formula

wherein R' is as defined above, in the presence of a mineral acid, a sulfuric acid ester or a lower alkyl monocarboxylic acid.

References Cited

UNITED STATES PATENTS 2,394,516  2/1946  Goshorn _____ 260—585 X
3,270,059  8/1966  Winderl _____ 260—585 X

OTHER REFERENCES

Societe Chimique de France, 1961, p. 1285.

CHARLES B. PARKER, Primary Examiner.

S. T. LAWRENCE III, Assistant Examiner.

U.S. Cl. X.R.

260—999